Oct. 31, 1933.  M. J. STRASBERGER  1,933,487
COMBINATION INDICATOR AND SCORE KEEPING DEVICE FOR BRIDGE GAMES
Filed Jan. 21, 1933
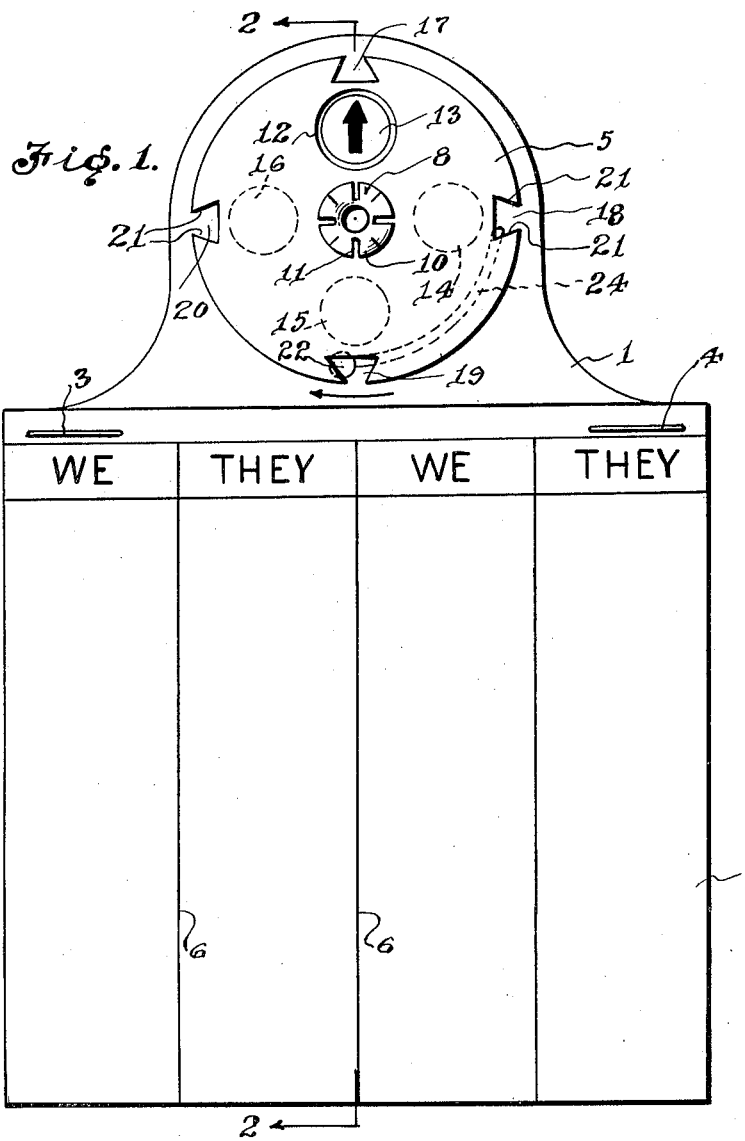
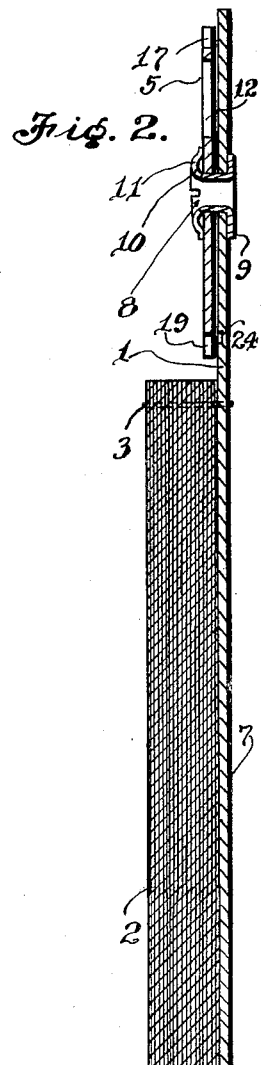
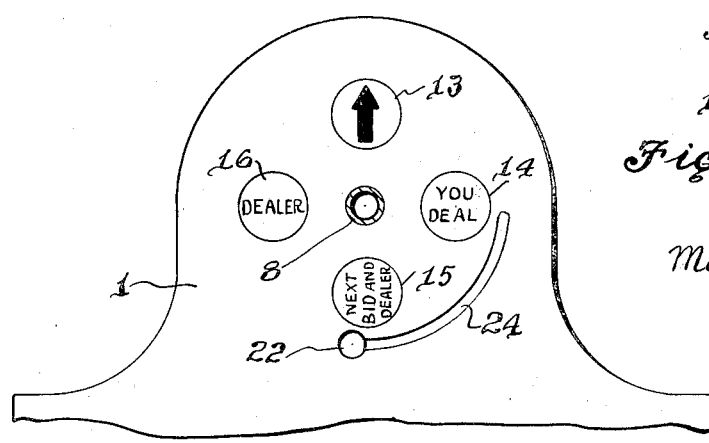
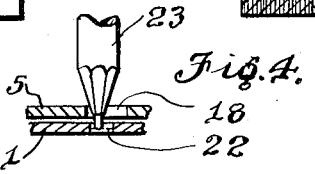
Inventor
Max J. Strasberger
By J. Kaplan
Attorney Patented Oct. 31, 1933

1,933,487

UNITED STATES PATENT OFFICE 1,933,487

COMBINATION INDICATOR AND SCORE KEEPING DEVICE FOR BRIDGE GAMES

Max J. Strasberger, Brooklyn, N. Y.

Application January 21, 1933. Serial No. 652,914

7 Claims. (Cl. 40—61)

This invention relates to games and more particularly to an indicator, and a combination of indicator and score pad for bridge games to indicate the dealer who is next in turn to deal the cards, to prevent bid by others before dealer has declared, and also to record the scores made by the players.

Very often when playing the game of bridge one whose turn it is to deal the cards forgets to do so, especially when a conversation is going on among the players which generally distracts their attention.

It is therefore the main object of this invention to provide accurate and visual means to indicate the proper order of dealing, prevent out of turn bids and thereby avoiding undue confusion and penalties.

Another object of the invention is to combine the indicating device and scoring pad to enable score keeper to record score of players and rotate indicating means for next dealer with ease and convenience.

Another object of the invention is to provide means to revolve the indicating means by a pencil.

Other objects of the invention will appear as the disclosure progresses. The drawing is intended to merely indicate a possible embodiment of the invention. It is obvious that the actual needs of manufacture may necessitate certain mechanical changes. It is therefore not intended to limit the invention to the embodiment illustrated but rather to define such limits in the appended claims. For a more general understanding of the invention attention is called to the drawing. In the drawing like reference characters denote like parts throughout the specification.

In the drawing:

Figure 1 is a view of the combination indicator and score keeping device.

Figure 2 is a section on line 2—2 of Figure 1.

Figure 3 is a fragmentary view of the backing with the revolvable disk removed and Figure 4 is a view showing the pencil point inserted in the disk notch and hole in the backing.

Referring now to the drawing in detail, numeral 1 designates the backing, 2 a pad of score keeping sheets attached to the backing by the staple 3 and 4. Mounted on the backing is a revolvable disk 5. The score keeping sheets are conveniently divided by the lines 6 to keep a record of the players and printed on the rear 7 of the backing can be the bridge rules, penalties and premiums for scoring.

The revolvable disk 5 is mounted on the backing by means of the flanged ring 8. The rear flange 9 of the ring bears against the backing while the said flange 10 has a series of splits to cause the said flange to resiliently bear against the disk and create a certain amount of friction between the meeting faces of the disk and backing and this prevents the disk from revolving too easily or accidentally. Cut in the face of the disk is a circular hole 12 which successively registers with a series of indicia 13, 14, 15 and 16 on the backing. On the periphery of the disk are four triangular notches 17, 18, 19 and 20. The sides 21 of the slots are sloping for a purpose to be later described. Below the indicia 15 and somewhat to the left is a hole 22 passing directly through the backing.

The operation of the device is as follows: The disk is set in a position as shown in Figure 1 with the hole 12 in registry with the indicia 13 which shows the arrow pointing to the one whose turn it is to deal. After the play is over the operator of the device records the score on the pad and sticks the pencil 23 used to record the play, into the notch 18 and revolves the disk until the pencil point enters the hole 22. When the notch is in this position the hole 12 will register with the indicia 14 showing that the player opposite said indicia is the one whose turn it is to deal. After the play is over the operator will record the score on the pad and will revolve the disk clockwise again through an arc of 90 degrees. Thus this operator will keep on during the progress of the game. With a little experience the operator or score keeper will instinctively revolve the disk right after writing down the score and thus there will be no chance of forgetting whose turn it is to deal the cards. Numeral 24 designates the track the pencil takes when successively revolving the disk.

It will thus be seen that I have provided a simple, useful and efficient device to record the score of bridge games and indicate whose turn it is to deal and bid without any chance of skipping the proper dealer. The walls 21 of the notches 18 formed in the periphery of the disk slope outwardly towards the center of the disk. The purpose of this arrangement is to retain the point of the pencil in its proper place and prevent the pencil from leaving the disk until the point registers with the hole in the backing or accidentally breaking the pencil point. The purpose of having both walls 21 of the slots 18 slope opposite each other is to hold the pencil point in place in the same way should the disk be rotated anti-clockwise.

Having described my invention, I claim:

1. In a device for indicating the inturn dealer and declarer in bridge games, the combination of a backing, of a revolvable disk mounted on said backing, said backing provided with a series of indicia and adapted to successively register with a hole in said disk, the periphery of said disk provided with notches adapted to successively register with a hole in said backing, the notches in said disk tapering outwardly towards the center of said disk.

2. In a device for indicating the inturn dealer and declarer in bridge games, the combination of a backing, of a revolvable disk mounted on said backing, said backing provided with a series of indicia and adapted to successively register with a hole in said disk, the periphery of said disk provided with notches adapted to successively register with a hole in said backing, the notches in said disk tapering outwardly towards the center of said disk, and means to cause the said disk to frictionally bear against said backing.

3. In a device for indicating the inturn dealer and declarer in bridge games, a backing, a series of indicia on said backing, a revolvable disk mounted on said backing and provided with a hole which succesively registers with the indicia in said backing, a series of notches at the periphery of said disk for successively registering with a hole in said backing.

4. In a device for indicating the inturn dealer and declarer in bridge games, a backing, a series of indicia on said backing, a revolvable disk mounted on said backing and provided with a hole which successively registers with the indicia in said backing, a series of notches at the periphery of said disk for successively registering with a hole in said backing, the opposite sides of said notches tapering outwardly towards the center.

5. In a device for indicating the inturn dealer and declarer in bridge games, a backing, a series of indicia on said backing, a revolvable disk mounted on said backing and provided with a hole which successively registers with the indicia in said backing, a series of notches at the periphery of said disk for successively registering with a hole in said backing, said backing extending below said disk, and a score keeping pad attached to said backing.

6. In a device for indicating the inturn dealer and declarer in bridge games, a backing, a series of indicia on said backing, a revolvable disk mounted on said backing and provided with a hole which successively registers with the indicia in said backing, a series of notches at the periphery of said disk for successively registering with a hole in said backing, the opposite sides of said notches tapering outwardly towards the center, and means to cause frictional contact between the meeting faces of said disk and said backing.

7. In a device for indicating the inturn dealer and declarer in bridge games, the combination of a backing, of a revolvable disk mounted on said backing, said backing provided with a series of indicia and adapted to successively register with a hole in said disk, the periphery of said disk provided with notches adapted to successively register with a hole for a pencil to enter in said backing, said notches comprising a straight base and having inclined walls for positioning a pencil at the meeting point of said base and one of the walls.

MAX J. STRASBERGER.